United States Patent [19]

Brose

[11] Patent Number: 4,898,120

[45] Date of Patent: Feb. 6, 1990

[54] ANIMAL TRAINING AND RESTRAINING SYSTEM

[75] Inventor: Peter W. Brose, Harwinton, Conn.

[73] Assignee: Torrington Product Ventures, Inc., New Hartford, Conn.

[21] Appl. No.: 207,541

[22] Filed: Jun. 16, 1988

[51] Int. Cl.$^4$ ............................................. A01K 15/02
[52] U.S. Cl. ....................................... 119/29; 340/573
[58] Field of Search .................. 119/29, 106; 340/573; 455/53

[56] References Cited

U.S. PATENT DOCUMENTS

| | | | |
|---|---|---|---|
| 2,703,344 | 4/1949 | Anderson | 119/29 |
| 2,800,104 | 7/1957 | Cameron et al. | 119/29 |
| 2,996,043 | 12/1958 | Pettingill | 119/131 |
| 3,589,337 | 6/1971 | Doss | 119/29 |
| 3,608,524 | 9/1971 | Waltz | 119/29 |
| 3,753,421 | 8/1973 | Peck | 119/29 |
| 3,777,712 | 12/1973 | Gardner et al. | 119/29 |
| 3,827,403 | 8/1974 | Meyer | 119/29 |
| 3,897,753 | 8/1975 | Lee et al. | 119/51 R |
| 3,980,051 | 9/1976 | Fury | 119/29 |
| 3,983,483 | 9/1976 | Pendo | 325/16 |
| 4,136,338 | 1/1979 | Antenore | 340/551 |
| 4,202,293 | 5/1980 | Gonda et al. | 119/29 |
| 4,335,682 | 6/1982 | Gonda et al. | 119/29 |
| 4,481,428 | 11/1984 | Charlot, Jr. | 340/870.26 X |
| 4,597,105 | 6/1986 | Freeburg | 455/56 X |
| 4,630,571 | 12/1986 | Palmer | 119/29 |
| 4,733,633 | 3/1988 | Yarnall, Sr. et al. | 119/29 |
| 4,745,882 | 5/1988 | Yarnall, Sr. et al. | 119/29 |
| 4,766,847 | 8/1988 | Venczel et al. | 119/29 |
| 4,777,478 | 10/1988 | Hirsch et al. | 340/573 |

Primary Examiner—Robert P. Swiatek

[57] ABSTRACT

A system for training an animal to remain in a predefined area comprising a plurality of distance zones from a central point where the perimeters of the distance zones are measured by the received strength of a radio frequency transmission, comprising a transmitter, a receiver for receiving transmissions, a measurement circuit for establishing a numerical value of the magnitude of a received transmission from the transmitter with respect to each of the zone perimeters, a digital memory for storing numerical values, control logic for converting the magnitude of the received transmission to a numerical value, control logic for comparing the received transmission numerical value with the stored numerical values, an animal control signal generator mounted on the animal for imparting warning sounds and applying physical stimuli, and an actuation circuit responsive to the comparison logic for actuating the signal generator for imparting to produce one or both of the warning sounds or stimuli to the animal dependent on the animal's location with respect to a zone, one of the transmitter and receiver being located at a central point with respect to the zone perimeters and the other of the transmitter and receiver being carried on the signal generator mounted on the animal.

19 Claims, 4 Drawing Sheets

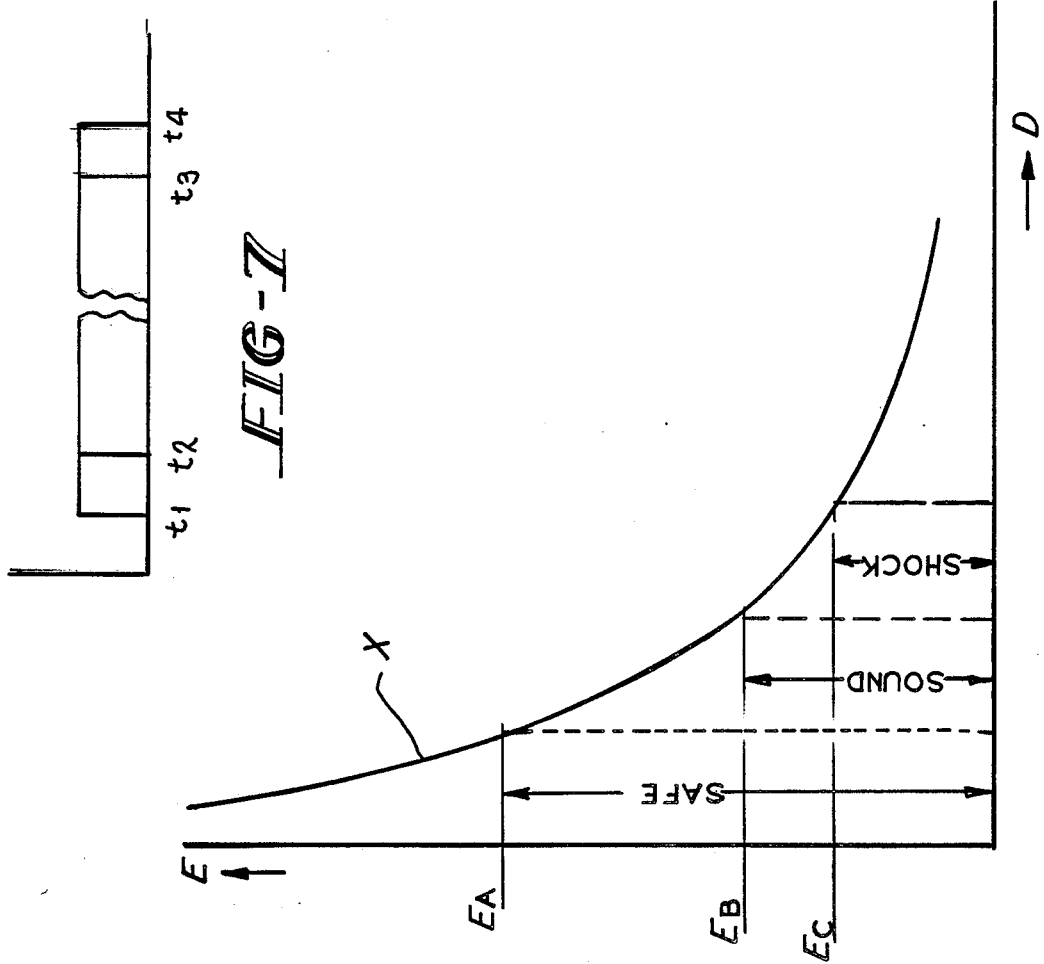
FIG-7
FIG-6
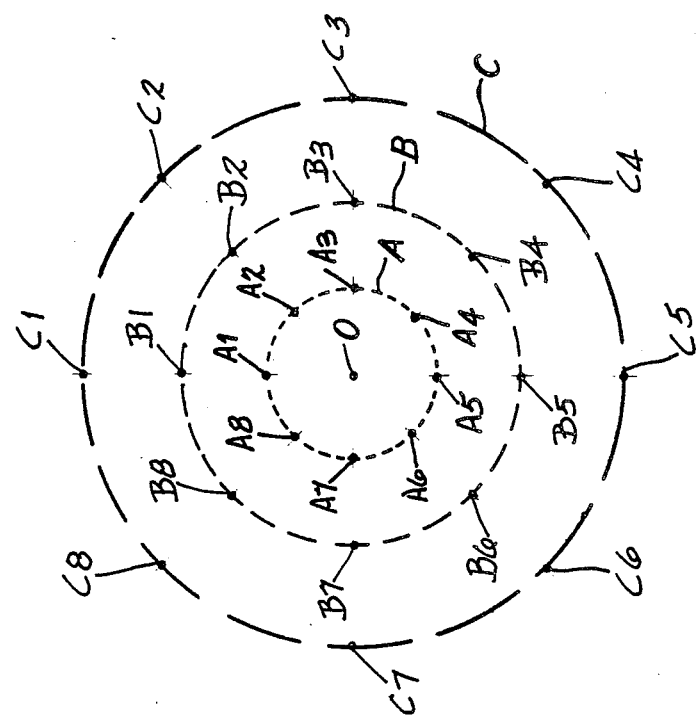
FIG-5

ANIMAL TRAINING AND RESTRAINING SYSTEM

FIELD OF THE INVENTION

This invention relates to apparatus for training animals, particularly dogs, and more particularly relates to apparatus to maintain the animal in a predetermined area.

BACKGROUND OF THE INVENTION

Arrangements have previously been proposed to maintain an animal such as a dog in a predetermined area. U.S Pat. No. 3,753,421 discloses an above ground horizontal antenna, or signal emitting wire, which surrounds a given area, and a high voltage receiver circuit is mounted to the animal for receiving a signal from the wire and producing a physical effect on the animal as it approaches the wire. Similar arrangements have been constructed utilizing a buried antenna. The intensity of the physical effect which is an electrical shock may increase as the dog approaches the antenna.

Other animal training devices have been proposed which require a trainer to carry a radio transmitter-receiver and signal to the animal if the animal strays too far, which arrangement is shown in U.S. Pat. No. 2,800,104. Also, radio transmitter receiver arrangements have been used in training of an animal which includes a facility for imparting a voltage shock to the animal as an aid in training.

Apparatus has further been proposed where the animal wears a responder which is responsive to an ultrasonic transmitter and the distance of the animal from the transmitter is measured by the round trip time of the transmitted signal, as exemplified in U.S. Pat. No. 3,980,051.

The first mentioned system may be obtrusive in appearance and if buried may be quite expensive. The known training devices such as exemplified by U.S. Pat. No. 2,800,104 require the master or trainer to be in attendance at all times.

Accordingly, the present invention provides a system which comprises a stationary central control unit and an animal mounted transmitter-receiver which can produce various physical effects on the animal dependent upon the distance of the animal from the central control. Once a plurality of distances or zones are established, there is no further need for human attendance. Additionally, a system embodying the invention may provide a behavior pattern of the dog.

SUMMARY OF THE INVENTION

The system embodying the invention utilizes the fact that the electrical field strength with a receiving antenna will decrease with distance from a transmitter. Thus, if the animal is carrying a transmitter, the field strength at the receiving antenna will have a relationship to the distance of the animal from a central control station. Periodically, the transmitter on the animal will transmit a signal. This signal is detected and applied to an analog-to-digital converter to establish a numerical value in binary form which is indicative of the distance of the animal from the control station.

The control station includes a central processing unit and a digital memory. Stored in the memory are numerical values which are indicative of a plurality of distances from a control station.

The numeric value of a received signal is then compared with the stored values to determine if any action is necessary to control the animal, which for purposes of disclosure, will be considered a dog. The dog wears a collar or harness having thereon a small transceiver including a small speaker or other audio device for converting an electrical signal to audio. The unit will also have a pair of electrical contacts or probes which can impart a shock to the dog.

So long as the signals received from the dog mounted transceiver are above a first predetermined value, the dog will be within a first generally circular zone and is considered obedient. If the dog should leave the first zone and enter the second zone, this will be signified by a weaker signal received at the control station, the control station will send a signal to the dog mounted transceiver and cause it to emit a sound frequency signal which is offensive to the dog. If the dog continues to move away, the dog mounted transceiver may be signaled by the central control to emit a sound which is more offensive. If the dog continues to move away from the central control, the dog mounted transceiver will be signaled to energize the contacts and impart an electrical shock to the dog.

The central control may also signal the dog mounted transceiver to emit a signal which is soothing to the dog.

In a second embodiment of the invention, the control logic is mounted to the animal, and a central transmitter continuously transmits a signal which is decoded into a distance measurement.

A system embodying the invention may have other features to determine the speed at which a dog is moving towards or away from the control station and further has provision for determining a pattern of behavior of the dog over a period of time.

An object of this invention is to provide a new and improved animal restraint and training system.

Another object of this invention is to provide a new and improved system for restraining the wandering of an animal which will provide a history of the behavior of an animal.

A further object of this invention is to provide an animal restraint and training system in which the speed and direction of movement of the animal may be ascertained.

The features of the invention which are believed to be novel are particularly pointed out and distinctly claimed in the concluding portion of the specification. The invention, however, together with further objects and advantages thereof, may best be appreciated by reference to the following detailed description taken in conjunction with the drawings.

BRIEF DESCRIPTION OF THE DRAWINGS

FIG. 5 is a graphical representation of the field strength of a receiving antenna with respect to distance from a transmitter;

FIG. 6 is a representation of an area in which an animal is constrained in accordance with the invention;

FIG. 7 is a timing diagram; and

DETAILED DESCRIPTION OF THE PREFERRED EMBODIMENT OF THE INVENTION

Figure 1:
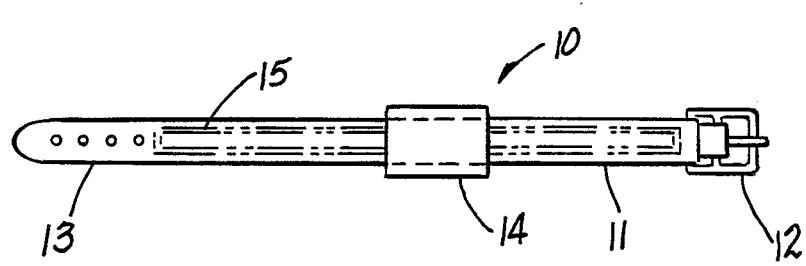
FIG. 1 is a view of an animal collar which may be utilized in the invention.

Reference is first made to FIG. 1 which illustrates an animal collar generally indicated by the reference numeral 10 which includes a strap 11 having a buckle 12 adapted to receive the free end 13 of the strap. Mounted to the strap 11 is a control device 14 which includes both a receiver and a transmitter, as hereinafter described. An antenna 15 for the receiver and transmitter is interwoven along the length of the strap alternately extending from one side and then the other.

In the alternative, the antenna may be a flexible shaft, sometimes known as a "rubber ducky".

Figure 2:
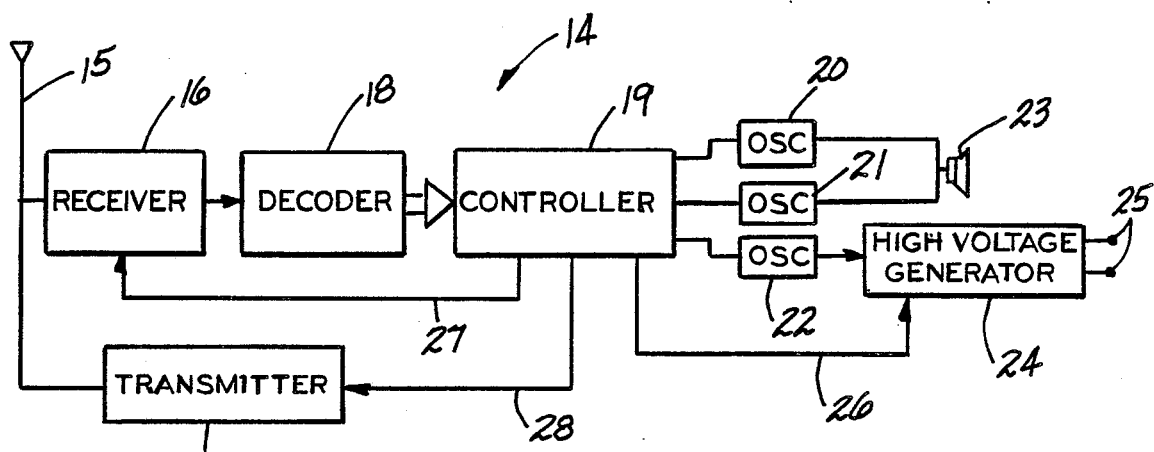
FIG. 2 is a view in schematic and block form of a device mounted to the animal collar.

FIG. 2 exemplifies the controller 14 of FIG. 1 and includes the antenna 15 connected to a receiver 16 and a transmitter 17. The receiver 16 will supply a binary encoded signal received from antenna 15 to a decoder 18 which will then supply a binary signal to a controller 19. The binary signals are preferably four bit and signify what function the controller is to perform. The controller 19 has a plurality of outputs to oscillators (OSC) 20, 21 and 22. Oscillator 20 is adapted to provide a relatively low frequency signal on the order of 10 KHz or less to a speaker or other sound reproduction device 23 where the frequency is designed to soothe an animal, particularly a dog. Oscillator 21 is a variable frequency oscillator which may produce selected frequencies above 15 KHz, which are repulsive to a dog. Oscillator 22 supplies a high voltage generator 24 having output probes or contacts 25 in contact with the animal's neck and extending from the housing 14 so that an animal, particularly a dog, may be shocked depending upon the signal received from antenna 15. Controller 19 also supplies an enabling signal over a line 26 to generator 24 when the dog is to be shocked. Controller 19 is primarily a switching device response to the received binary code to energize a particular device. Controller 19 also supplies signals over lines 27 and 28 to receiver 16 and transmitter 17, respectively, to enable or disable these units on a timed basis.

Figure 3:
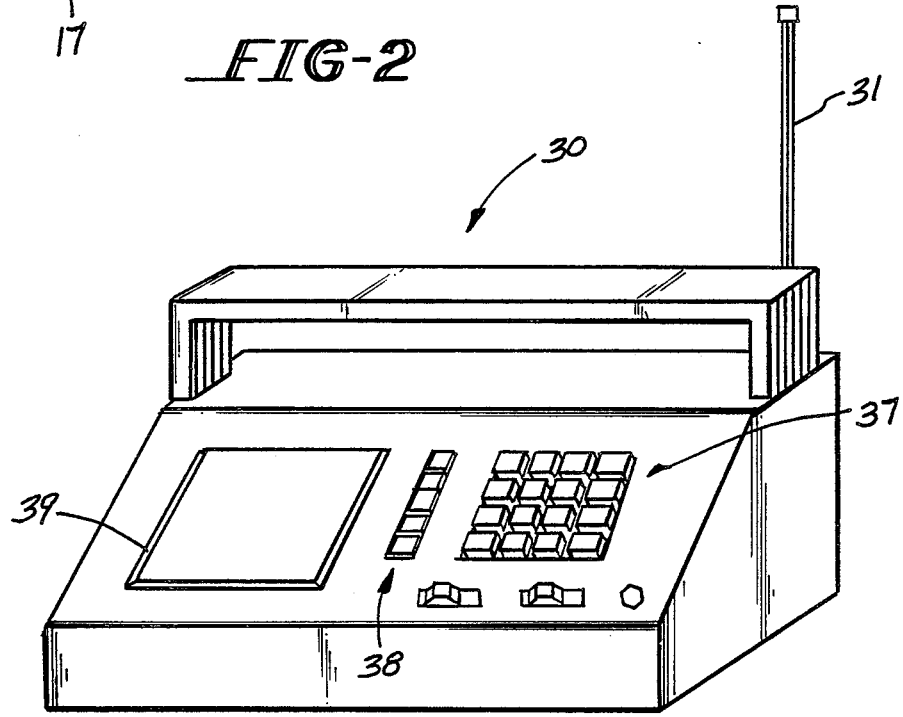
FIG. 3 is a perspective view of a central control unit utilized in the invention.

Reference is now made to FIG. 3 which exemplifies a central control unit 30 in the form of a microcomputer and which also which includes a receiver and a transmitter and other logic hereinafter described. Unit 30 has an antenna 31 adapted to receive a signal transmitted from transmitter 17 via antenna 15. Included within unit 30 is a receiver 32 and a transmitter 33. The signal received by receiver 32 is applied to an analog to digital converter 34 which is, in turn, applied to a central processing unit (CPU) 35 which includes an arithmetic logic unit for calculations as hereinafter pointed out. The CPU 35 is arranged to supply a binary signal to an encoder 36, which in turn provides a serial input to transmitter 33 for transmission via antenna 31 to the antenna 15 on the collar 11. The CPU may receive inputs from a key pad 37 on unit 30, a row of push buttons 38, and provide an output to an LCD display 39. Communicating with CPU 35 over a bus 40 is a read only memory (ROM) 41 and a random access memory (RAM) 42.

The read only memory 41 will store a program for the CPU while the random access memory 42 will store data indicative of animal behavior, and other data as hereinafter described.

The CPU 35 may also output stored data from RAM 42 to a printer 43 or to a cathode ray tube (CRT) 44.

So long as the animal is within the perimeter A, the animal will receive only a soothing frequency signal or no signal. If the animal wanders to the perimeter B, a higher frequency warning signal, which is objectionable to the animal, will be transmitted to receiver 16; and if the animal wanders to the perimeter C, the probes 25 will be energized to provide an electrical shock to the animal as well as the higher frequency warning signals.

Reference is now made to FIG. 5 which shows a curve X of the field strength of a signal received at antenna 31, the field strength being denoted by E as a function of distance D from antenna 15. The relationship of the field strength of the signal at the antenna 31 is given by the equation:

$$E = K \times \frac{I}{u} \times \frac{H}{d}$$

where
I is the current in the antenna;
u is the wave length of the received signal;
H is the height of the antenna;
d is the distance; and
K is a constant.

As will be hereinafter more fully described, the field strength $E_A$ indicates that the animal is within the area A as shown in FIG. 6. Field strength $E_B$ indicates that the animal has wandered to the extreme of the area denoted by B in FIG. 6, while the field strength $E_C$ indicates that the animal has wandered to the perimeter C shown in FIG. 6. When the signal is at a value of $E_A$ or greater, this is considered to be a "Safe" or normal area and no warning is given to the animal. If the signal falls below $E_B$, the animal is given a plurality of sound warnings of increasing frequency as it approaches perimeter C. If the animal reaches a distance where the signal falls to $E_C$, electric shocks of increasing intensity with distance will be applied.

Figure 4:
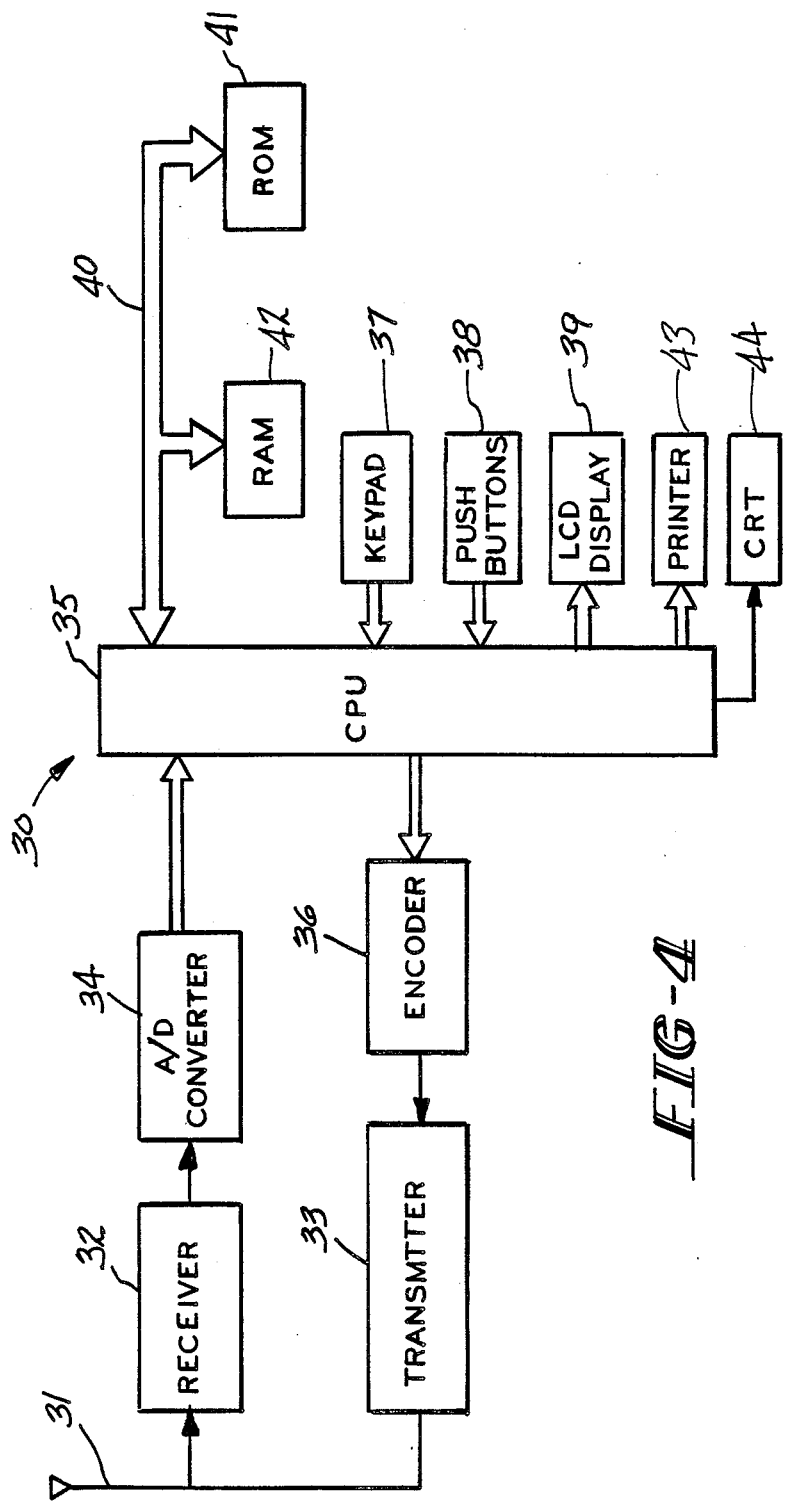
FIG. 4 is a block and schematic diagram of the contents of the central controller of FIG. 3.

The system thus far described operates on the basis that the electrical field strength at an antenna will decrease with distance from a remote transmitter. Thus the field strength at antenna 31 will be related to the distance of the animal and transmitter 17 from the central control station of FIG. 4. A received signal from the system 14 of FIG. 2 is converted to digital form in A/D converter 34, and this value will then be stored in RAM 42 and then compared with binary data which is indicative of predetermined distances of the animal from the central unit of FIG. 4. This received signal is periodically transmitted by unit 14 and comprises a plurality of pulses as hereinafter described.

Reference is now made to FIG. 7 which sets forth the timing of a system embodying the invention. In a cycle of operation, the first signal is termed the "identification signal" and this is broadcast from the animal transmitter 17 for a short period of time, perhaps 100 ms from time $t_1$ to $t_2$. Following this there is a computation time, $t_2$ to $t_3$, in which the CPU 35 will decode the received signal and determine the distance from transmitter 17. Subsequently, there is a control signal which may last for 50 ms, from time $t_3$ to $t_4$. The control signal elicits transmission of another identification signal from unit 14.

Reference is now made to FIG. 6 which shows three concentric circles A, B, and C having a center O. To initiate the system, the remote unit of FIG. 2 is first carried a given distance from the center O where the control unit 30 is placed. Then the control unit 30 is turned on and switched to what is termed a "learn" mode, and then is used to initiate transmission of test pulses from unit 14. When this is done, remote unit 14 is carried to a point which is a predetermined distance away from the control unit 30, as exemplified by the circle or perimeter A of FIG. 6. The user will then transmit an identification signal comprising a plurality of pulses from perimeter A to the controller at point O. These pulses are received at receiver 32, detected and converted to a digital numerical value by A/D converter 34, and stored in digital form as an indication of the distance of the unit 14 from the unit 30.

In the initialization of the system, transmitter 14 will send out ten or more test pulses from each of the locations indicated as A1–A8. These test pulses are detected by receiver 32 and applied to A/D converter 34 which established a numerical representation of the strength of each of the received test pulses in binary form. At each of the points A1–A8, an average of the strength of the test pulses is taken and also the minimum and maximum number, and these three values will be stored in memory in RAM 42. The average of the average of all samples will then be used as the threshhold for the particular distance. The maximum of all maximums is also stored as an upper deviation value and the minimum of all minimums as the lower deviation value. At this point, the person who carries the remote unit 14 turns off its power. The perimeter A has now been established to define the area where no warning will be applied to the animal. The person carrying the remote unit 14 will then move to the perimeter B. The same procedure is followed, and an average of the averages of the strength of the transmission received at point O will be stored in memory 37, with the highest of all of the maximums and the lowest of the minimums. The distance from A–B may be termed a "sound distance". After the points B1–B8 have been established, the remote unit 14 is then moved to the perimeter C and again the strength of the signals received at point O and transmitted from points C1–C8 will be averaged. At this point, only the three average of averages, together with each maximum and minimum deviation from the three average of the averages are stored in RAM 42 for comparison with received identification signals when the system is in an operational mode.

The procedure described above in establishing binary representations of the distances A, B, and C from point O is referred to as the Learn Mode.

The magnitude of the signals received at antenna 31 for a given perimeter will not be constant for a given distance but will fluctuate between a maximum and minimum value. Additionally, the geometric response of the antenna is not an ideal circle. The statistical evaluation of the data received in the Learn Mode takes these facts in establishing the maximum and minimum numerical values for each perimeter.

Assume the average numerical value at perimeter A is 1700 and the range determined by the difference between the maximum of maximums and the minimum of minimums is 150 to 1900, the average numerical value at perimeter B is 1100 and the range is 900 to 1300, and the average numerical value at perimeter C is 500 and the range is 300–700.

Thus, if an animal moves from perimeter A to perimeter C, the transmitter 17 will broadcast signals, which are received at receiver 32, having numerical values of 1700 to 500. The average numerical for each perimeter and the maximum and minimum numerical values may be utilized to trigger a sound and/or electrical stimulus to the animal. The severity of the sound or stimulus will increase with decreasing numerical value of the signal from transmitter 17.

As will hereinafter be explained, the system may issue several warnings to the animal in the form of varying levels of a frequency signal. As the animal moves between the perimeters A and B, the signal increases in frequency as the animal reaches the maximum numerical signal for perimeter A, and further increases in frequency as the animal reaches the minimum numerical value for perimeter B. The stored numerical numbers, upon comparison with the numerical value of the received signal, will act as trigger points to determine the action taken with the animal. In a similar manner, as the animal moves away from perimeter B towards perimeter C, an electric shock may be applied of increasing intensity as the animal approaches perimeter C.

The direction of movement of the animal from point O may be determined by comparison of succeeding identification transmissions. If $V(T)$ is the strength of the last received identification transmission, and if $V(T-1)$ is the strength of the previous identification transmissions at time $T-1$, then if $$V(T-1)-V(T)<0$$

the animal is moving away from the unit 30. If $$V(T-1)-V(T)>0$$

then the animal is moving toward unit 30. If $$V(T-1)-V(T)=0$$

then the animal is not moving or is moving within the same range as the previous identification transmission.

The identification transmission from transmitter 17 consists of a number of pulse transmissions between times $t_1$ and $t_2$. The number of pulses may be on the order of eight to twenty-five during the time $t_1$-$t_2$. The pulse width may vary from 2.5 ms to 10 ms. These pulses may be varying in amplitude when received at receiver 32. The A/D converter 34 converts the pulse amplitudes to binary form. Then CPU 35 performs arithmetical operations to determine the average field strength, the maximum and minimum values, and the time of reception.

The CPU 35 also determines the speed of movement of the animal in the following manner:

$$D\ (T,\ \text{average}) - D\ (T-1,\ \text{average}) = AD$$

$$AD = \text{speed}\left(\frac{\text{bits}}{\text{Second}}\right) = S$$

where
 D = distance
 T = last reception
 T−1 = previous identification reception
 AD = distance moved between receptions This operation provides information as to how fast the animal is moving. As previously explained, the direction of movement may also be determined.

Set forth below in Table I is a listing of the binary control codes which may be transmitted by the central unit 30:

TABLE I

| CONTROL CODES | |
|---|---|
| 0000 | No Action |
| 0001 | Learn Start |
| 0010 | Operate Start |
| 0011 | Responsive Training Start |
| 0100 | End of Transmission |
| 0101 | Warning 1 |
| 0110 | Warning 2 (increase frequency) |
| 0111 | Warning 3 (increase frequency) |
| 1000 | Stimulus 1 |
| 1001 | Stimulus 2 |
| 1010 | Stimulus 3 |
| 1011 | Receiver Talk |
| 1110 | Learn End |

If desired, the sound warnings may also be transmitted with the stimulus code.

The RAM 42 has established therein a first in - first out (FIFO) register with twelve eight bit byte columns and two hundred fifty-six rows. This may be termed a "behavior array". In each row of bytes are the following:

| Byte No. | Content |
|---|---|
| 0–2 | Time of input of identification signal |
| 3–4 | Average of each identification signal reading |
| 5 | Limit width (difference between high and low of each identification signal pulse) |
| 6 | Current distance of unit 14 |
| 7 | Control Actions taken |
| 8 | Animal Behavior |
| 9 | Warning Shift Register |
| 10 | Stimulation Shift Register |
| 11 | A Zone Shift Register |

Byte seven will record for each cycle the action taken as follows:

0000000—Zone A, no action taken
00010000—Zone B, no action taken
00010001—Zone B, first warning
00010010—Zone B, second warning
00010011—Zone B, third warning
00010100—Zone B, fourth warning
00110001—Zone C, fourth warning plus first stimulus
00110010—Zone C, first warning plus second stimulus
00110011—Zone C, second warning plus second stimulus The severity of the warnings and the stimulus (electric shock) will increase with distance from point O. Thus, as the strength of the identification signal from transmitter 17 decreases, the warnings and possibly the stimulus will be more frequent.

Byte eight is a record of the animal behavior when the unit is in the operate mode, as follows:

| bit | | |
|---|---|---|
| 0 | 0 | = obedient |
| | 1 | = disobedient |
| 1 | 0 | = warning applied |
| | 1 | = stimulus applied |
| 2, 3 | 00 | = learn mode |
| | 01 | = operate mode |
| 4, 5, 6, 7 | 11 | = responsive training mode control cycle time |

The control cycle time may be set in accordance with the record of behavior of the animal, that is, if the animal is not active in movement, the time between transmission of the control pulses ($t_3$–$t_4$) may be increased.

The shift registers will store a record over a period of time of where the animal is in the field of control, that is, in which zone. This may be printed out on a printer 43, or observed on a cathode ray tube (CRT) 44. From this the trainer can see a history of behavior of the animal over a period of time.

After each transmission is performed to determine the distance to the animal, all the rows of the FIFO register are shifted up one address, and the time at the end of the present transmission is placed in row 0 of the array in bytes 0–2.

The three shift registers will give a record of the movement of the animal in the three different zones. These registers will store the position of the animal with respect to the zones during the last eight control cycles. This information will be used to depict movements, location of the animal, and establish behavioral patterns which can be prepared to the proper actions which have been taken.

The zone shift registers express the behavior of the dog in numerical patterns and can be used to establish automatically the best suited times for the control cycles.

Another use of the position shift registers is to prepare a self-check of the system. At the end of each computation period ($t_2$–$t_3$) before command will be applied, a check is made to determine whether the present cycle established a valid evaluation. This is the case if the sum of all the bits in all registers does not exceed eight. If it does exceed eight, that cycle will be invalidated and a new timing cycle started, and the cycle counter will not be incremented.

Thus far, two modes have been discussed, that is, the Learn Mode and the Operate Mode. A system embodying the invention may also be used in what is termed, a "Responsive Training Mode". In this mode, the system will be used to train the animal under control of a human trainer. In the Responsive Training Mode, the commands to the animal are applied by a human trainer using key pad 37 to instruct the CPU 35 to take a certain action and the response of the animal may be viewed on the LCD display 39. The action taken by the trainer and the response of the animal are recorded in the memory and can be recalled later.

An example of a cycle of operation will now be discussed. A control transmission ($t_3$–$t_4$) is made to elicit an identification signal. When the identification signal is received, the time of input, the average of the readings, the limit width between the readings, and the current distance zone are stored in RAM 42. The received identification signal is compared against the stored value for threshold C. If the value of the identification signal is smaller than the threshold C value, this indicates that the animal is moving out of control and immediately the strongest stimulus from the CPU will be applied. The speed S and the direction of the dog are computed and if the sign of the result is negative $$S(T) > S(T-1)$$

then the dog is moving in a disobedient direction, that is, away from point O.

If $$S(T) < \text{Threshold B}$$

then the animal is in the warning zone between perimeters A and B, and it is moving towards the stimulus zone, and warning two is issued. If the animal does not respond to this warning, a mild stimulus will be applied. If $$S(T) > \text{Threshold B}$$

then the animal is in the stimulus zone and moving so that it will get out of control. In a second comparison, the maximum value of "S (T)" is compared to Threshold B". If $$S(T) \text{ maximum} < \text{Threshold B}$$

then the animal probably moved closer to the border line. Its previous response to warnings will be checked in the behavior array and then dependent on the result of this test, the proper action will be taken.

The three shift registers in bytes 9, 10 and 11 of the FIFO register will give a record of the movement of the animal in the three different zones, and this is utilized to initiate which action should be applied to the animal at any particular time. These registers are used to store the position of the animal during the last eight control cycles, and this information is used to depict movements, location of the animal and establish behavioral patterns which can be compared to the proper actions which have been taken. These registers will be used to judge the animal's present behavior based on its past record. The zone shift registers express the behavior of the dog in numerical patterns and can be used to establish automatically the best suited times for the control cycles, that is, the frequency of initiation of a control cycle.

Figure 8:
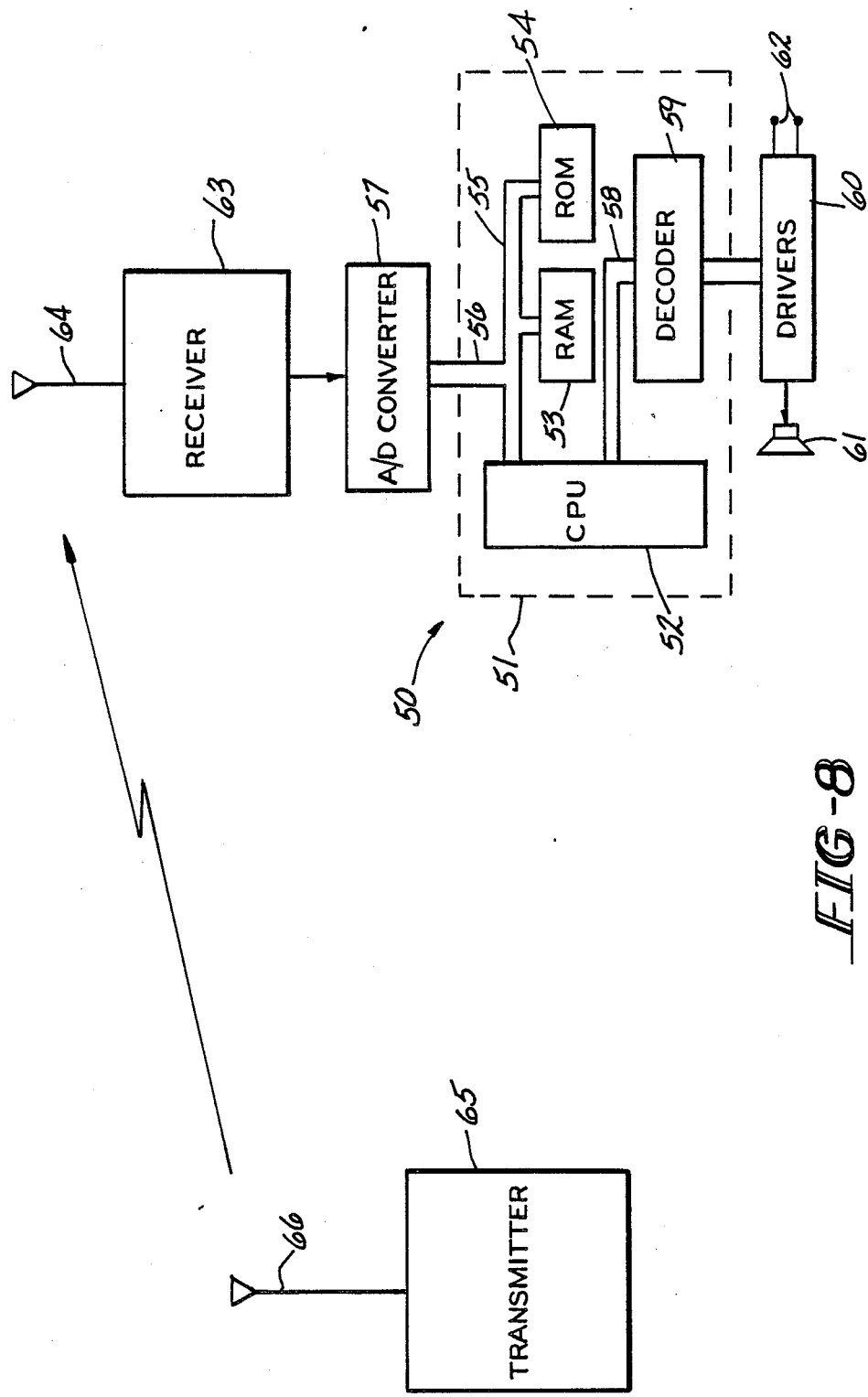
FIG. 8 is a block diagram of an alternate embodiment of the invention.

The invention may be modified so that the primary logic circuitry is carried by the animal. FIG. 8 exemplifies a logic network 50 arranged to be mounted to the animal on a collar 10 as shown in FIG. 1, or a harness or other fastening apparatus or an animal, particularly a dog.

The logic network 50 of FIG. 8 comprises a microcomputer 51 with a central processing unit (CPU) 52 which communicates with a RAM 53 and ROM 54 via a central bus 55 which also communicates with a bus 56 from an analog-to-digital converter 57. The CPU 52 outputs via a bus 58 to a decoder 59, which will decode instructions and apply the appropriate instructions to drivers 60 which will cause a sound reproducing device 61 to be energized at a selected frequency or energize probes 62 to provide an electrical stimulus to the animal. Analog-to-digital converter 57 receives a detected RF signal from an RF receiver 63 having an antenna 64. A central transmitter 65 having an antenna continuously transmits to receiver 63, as hereinafter described.

The Learn Mode of operation, to determine the perimeters A, B, and C, is as previously described except that transmitter 65 is continuously transmitting, and all arithmetical and control procedures are performed by the animal mounted microcomputer 51. Here, the microcomputer will be measuring the field strength of the signal received from antenna 66.

After the Learn Mode procedure has been completed, the collar or harness is mounted to the animal and microcomputer 51 is switched to the Operate Mode by a microswitch, not shown in FIG. 8. It will be apparent that in this embodiment, there will not be a Responsive Training Mode, since there can be no direct operator or trainer input to the collar mounted microcomputer 51.

The logical operation, storage, and arithmetical functioning of microcomputer 51 is the same as that of microcomputer 30. A minor difference is that CPU 52 outputs to a decoder 59 to control drivers for the various warnings and stimuli, while CPU 35 outputs to an encoder 36 for RF transmission.

While the invention has been described as utilizing three perimeters or zones, it is apparent that a different number may be established. Also, the various sound warnings and stimuli may be set for various distances within each zone.

It may thus be seen that the objects of the invention set forth, as well as those made apparent from the foregoing description, are efficiently attained. While preferred embodiments of the invention have been set forth for purposes of disclosure, modifications to the disclosed embodiments of the invention, as well as other embodiments thereof, may occur to those skilled in the art. Accordingly, the appended claims are intended to cover all embodiments of the invention and modifications to the disclosed embodiments which do not depart from the spirit and scope of the invention.

Having thus described the invention, what is claimed is:

1. A system for training an animal to remain in a predefined area comprising a plurality of distance zones from a central point where the perimeters of the distance zones are measured by the received strength of a radio frequency transmission, comprising a transmitter, receiver means for receiving transmissions, means for establishing a numerical value of the magnitude of a received transmission with respect to each of the zone perimeters, memory means for storing said numerical values, means for converting the magnitude of the received transmission to a numerical value, means for comparing the received transmission numerical value with the stored numerical values, means mounted on the animal for imparting warning sounds and applying physical stimuli, and means responsive to said comparison means for actuating said means for imparting to produce one or both of the warning sounds or stimuli to the animal dependent on the animal's location with respect to a zone, one of said transmitter and receiver being located at a central point with respect to said zone perimeters and the other of said transmitter and receiver being carried on said means mounted on the animal.

2. The system of claim 1 wherein a receiver is included on said means mounted on the animal, said transmitter is at said central point together with a control logic unit which includes said means for converting the magnitude of the received transmission to a numerical value, said memory means is at said central point and operably connected to said means for comparing, the numerical values in said memory means are established by averaging a plurality of transmissions from each perimeter and storing the average value for each perimeter together with the maximum value and the minimum value, said control logic unit being effective to cause periodic transmissions to the receiver on the animal and elicit a response from the transmitter mounted to the animal.

3. The system of claim 1 wherein said transmitter is at said central point and said means for establishing a numerical value, said means for converting, and said means for comparing are mounted on the animal.

4. An animal training system comprising a central logic unit including a radio transmitter and receiver, a unit for mounting on the animal which includes a transmitter and receiver, said central transmitter and receiver being effective to transmit signals to the animal unit and receive identification signals from the animal transmitter, means at said central logic unit for measuring the strength of a signal from the animal transmitter, means at said central logic unit for comparison of the measured strength of a signal from the animal transmitter with stored data relative to distance from the central logic unit, and means for initiating transmission of one a plurality of types of control signals to the animal.

5. The training system of claim 4 where said central logic unit includes memory means for storing binary data indicative of the strength of a signal received from said animal transmitter which is a function of a plurality of distance zones of the animal transmitter from said central logic unit.

6. The system of claim 4 where said animal unit includes means for producing sound and means for producing an electrical stimulus.

7. The system of claim 4 where said control signal transmissions are repetitively transmitted to elicit a return identification signal.

8. The system of claim 7 where said central logic unit includes a central processing unit including arithmetic logic and is effective to determine from succeeding identification signals the direction the animal is moving with respect to the central control unit.

9. The system of claim 7 where said central logic unit includes a central processing unit including arithmetic logic and is effective to determine from succeeding identification signals the speed at which the animal is moving.

10. The system of claim 4 where said identification signals are a series of pulses, said central control unit includes a digital to analog converter, a central processing unit and a random access memory, said digital to analog converter is effective to convert a predetermined number of said pulses to binary signals, said central processing unit is effective to determine the average value of the binary signals and determine the minimum and maximum value of said binary signals, and said random access memory is effective to store the time of receipt of each of the identification signals, said average value, and the difference between said maximum and minimum values.

11. The system of claim 10 where said central logic unit includes memory means for storing binary data indicative of the strength of a signal received from said animal transmitter which is a function of a plurality of distance zones of the animal transmitter from said central logic unit where said memory also stores the distance zone of the animal from said control logic unit.

12. The system of claim 4 where said memory means further stores data indicative of the zone the animal is in over a period of time.

13. An animal training system comprising a logic unit adapted to be mounted on an animal and including a radio receiver, a central transmitter effective to transmit signals to the logic unit, means at said logic unit for measuring the strength of a signal from the transmitter, and means responsive to the strength of a signal from the transmitter for initiating application of one of a plurality of types of a control signal to the animal, said logic unit also including memory means for storing binary data indicative of the strength of a signal received from said transmitter which is a function of a plurality of distance zones of the transmitter from said logic unit.

14. The system of claim 13 where said logic unit includes means for producing varying frequency sound and means for producing an electrical stimulus to the animal.

15. The system of claim 13 where said transmission signal is continuously transmitted and said receiver periodically receives the transmitted signal.

16. An animal training system comprising a logic unit adapted to be mounted on an animal and including a radio receiver, a central transmitter effective to transmit signals to the logic unit, means at said logic unit for measuring the strength of a signal from the transmitter, and means responsive to the strength of a signal from the transmitter for initiating application of one of a plurality of types of a control signal to the animal, said logic unit including a central processing unit including arithmetic logic and is effective to determine from succeeding received signals the direction the animal is moving with respect to the transmitter, said transmission signal being continuously transmitted and said receiver periodically receiving the transmitted signal.

17. An animal training system comprising a logic unit adapted to be mounted on an animal and including a radio receiver, a central transmitter effective to transmit signals to the logic unit, means at said logic unit for measuring the strength of a signal from the transmitter, and means responsive to the strength of a signal from the transmitter for initiating application of one of a plurality of types of a control signal to the animal, said logic unit including a central processing unit including arithmetic logic and effective to determine from succeeding periodic receptions the speed at which the animal is moving, said transmission signal being continuously transmitted and said receiver periodically receiving the transmitted signal.

18. An animal training system comprising a logic unit adapted to be mounted on an animal and including a radio receiver, a central transmitter effective to transmit signals to the logic unit, means at said logic unit for measuring the strength of a signal from the transmitter, and means responsive to the strength of a signal from the transmitter for initiating application of one of a plurality of types of a control signal to the animal, said transmitted signal comprising a series of pulses, said logic unit including a digital to analog converter, a central processing unit and a random access memory, said digital to analog converter being effective to convert a predetermined number of said pulses to binary signals, said central processing unit being effective to determine the average value of the binary signals and determine the minimum and maximum value of sad binary signals, and said random access memory being effective to store said average value and the difference between said maximum and minimum values.

19. The system of claim 18 where said logic unit includes memory means for storing binary data indicative of the strength of a signal received from said transmitter which is a function of a plurality of distance zones of the transmitter from said logic unit and where said memory also stores the distance zone from said control logic unit from said transmitter.

* * * * *